(12) United States Patent
Zhang

(10) Patent No.: US 10,173,640 B1
(45) Date of Patent: Jan. 8, 2019

(54) SEAT BELT BUCKLE RELEASE ALARM DEVICE

(71) Applicant: Junhua Zhang, O'Fallon, IL (US)

(72) Inventor: Junhua Zhang, O'Fallon, IL (US)

( * ) Notice: Subject to any disclaimer, the term of this patent is extended or adjusted under 35 U.S.C. 154(b) by 0 days.

(21) Appl. No.: 15/947,799

(22) Filed: Apr. 7, 2018

Related U.S. Application Data

(60) Provisional application No. 62/519,475, filed on Jun. 14, 2017.

(51) Int. Cl.
*B60R 22/48* (2006.01)
*G08B 21/24* (2006.01)
*G08B 3/10* (2006.01)

(52) U.S. Cl.
CPC ............... *B60R 22/48* (2013.01); *G08B 3/10* (2013.01); *G08B 21/24* (2013.01); *B60R 2022/4816* (2013.01); *B60R 2022/4866* (2013.01)

(58) Field of Classification Search
CPC ............ B60R 22/48; B60R 2022/4816; B60R 2022/4866; G08B 3/10; G08B 21/24
See application file for complete search history.

(56) References Cited

U.S. PATENT DOCUMENTS

| | | | |
|---|---|---|---|
| 3,840,849 A | 10/1974 | Lohr | |
| 4,849,733 A | 7/1989 | Conigliaro et al. | |
| 5,406,252 A * | 4/1995 | Dear | B60R 22/48 200/61.58 B |
| 5,596,312 A | 1/1997 | Fowler et al. | |
| 6,002,325 A | 12/1999 | Conaway | |
| 6,339,371 B1 | 1/2002 | Baggelaar et al. | |
| 6,351,210 B1 | 2/2002 | Stewart | |
| 6,853,298 B1 | 2/2005 | Stojanowski | |
| 8,063,788 B1 | 11/2011 | Morningstar | |
| 8,289,145 B2 | 10/2012 | Miller et al. | |
| 8,816,839 B1 | 8/2014 | Rick | |
| 9,439,479 B1 | 9/2016 | Vu | |
| 9,539,983 B2 | 1/2017 | Demeritte | |
| 2014/0253314 A1* | 9/2014 | Rambadt | B60N 2/002 340/457.1 |
| 2016/0176380 A1* | 6/2016 | Demeritte | B60R 22/48 340/687 |
| 2017/0247015 A1 | 8/2017 | Davis | |
| 2018/0082563 A1* | 3/2018 | Cristella | G08B 21/0461 |

* cited by examiner

*Primary Examiner* — Brian A Zimmerman
*Assistant Examiner* — Sara B Samson
(74) *Attorney, Agent, or Firm* — Grace J. Fishel

(57) ABSTRACT

A seat belt buckle release alarm device is disclosed which has a housing having a seat belt buckle receiving portion and a control portion, an actuator formed in a top of the seat belt buckle receiving portion, a latch opening formed in the seat belt buckle receiving portion, a seat belt buckle opening formed in a bottom of the seat belt buckle receiving portion, the control portion having a top having an USB port, a speaker, a side portion, and a bottom portion with the top, the side portion, and the bottom portion for containing control circuitry, and the control portion extending out from the seat belt buckle receiving portion.

19 Claims, 5 Drawing Sheets

SEAT BELT BUCKLE RELEASE ALARM DEVICE

BACKGROUND OF THE INVENTION

Field of the Invention

The present disclosure relates generally to a device that serves either as a reminder or alert, and more particularly to a seat belt buckle release alarm device that serves to remind or alert a driver upon making ready to leave a vehicle.

Brief Description of the Prior Art

Every year preventable deaths occur when an infant, a child, or a pet is left in a car during extreme temperature conditions. For example, a parent may be distracted or forget that an infant is in a car seat and inadvertently leave the infant in the car. If the outside temperature is hot an infant may die of heatstroke in a few minutes. This is a tragic event that should be avoided or prevented. Car windows may be broken by a well meaning citizen seeing a child or pet in the vehicle even if not in immediate danger from heat or cold and the authorities may be summoned which is a further complication.

People sometimes fail to remember important things because they are very busy. They have too many things to do and remember; household chores, special events, pass codes, telephone numbers, birthdays, etc. Very frequently a person may think of something they need to remember, do, buy or pick up as they start to drive but by the time they reach their destination have forgotten it entirely. What is needed a device that serves as reminder or alert that can be set easily set even while driving or as a perpetual reminder such as "don't forget the baby."

BRIEF SUMMARY OF THE INVENTION

The present disclosure is designed to obviate and overcome the above problems and make life easier. The present disclosure is related to a seat belt buckle release alarm device that automatically plays back a recorded message to alert or remind a driver of a vehicle of something not to be forgotten. It is quick, simple and easy to use and does not interfere with the use of an existing seat belt buckle and seat belt.

In one form of the present disclosure, a seat belt buckle release alarm device is disclosed which comprises a housing having a seat belt buckle receiving portion and a control portion, an actuator formed in a top of the seat belt buckle receiving portion, a latch opening formed in the seat belt buckle receiving portion, a seat belt buckle opening formed in a bottom of the seat belt buckle receiving portion, the control portion having a top having an USB port opening, a speaker grill, a side portion, and a bottom portion with the top, the side portion, and the bottom portion for containing control circuitry, and the control portion extending out from the seat belt buckle receiving portion.

In another form of the present disclosure, a seat belt buckle release alarm device comprises a housing having a seat belt buckle receiving portion having an actuator formed in a top of the seat belt buckle receiving portion, a latch opening formed in the seat belt buckle receiving portion, and a seat belt buckle opening formed in a bottom of the seat belt buckle receiving portion and a side compartment extending out from the seat belt buckle receiving portion with the side compartment having a top having an USB port opening and a speaker grill, a side portion, a bottom portion having an opening formed therein with the top, the side portion, and the bottom forming an interior of the side compartment, and a casing for insertion into the interior of the side compartment, the casing having a circuit board having an USB port and a speaker.

In still another form of the present disclosure, a seat belt buckle release alarm device comprises a housing having a seat belt buckle receiving portion having an actuator formed in a top of the seat belt buckle receiving portion, a latch opening formed in the seat belt buckle receiving portion, and a seat belt buckle opening formed in a bottom of the seat belt buckle receiving portion and a side compartment extending out from the seat belt buckle receiving portion with the side compartment having a top having an USB port opening and a speaker grill, a side portion, a bottom portion having an opening formed therein with the top, the side portion, and the bottom portion forming an interior of the side compartment, and the bottom portion having a peripheral rim, and a casing for insertion into the interior of the side compartment, the casing having a circuit board having an USB port and a speaker with the peripheral rim formed in the bottom portion for retaining the casing within the interior of the side compartment.

In light of the foregoing comments, it will be recognized that the seat belt buckle release alarm device of the present disclosure provides a reminder to an individual of a condition of a vehicle.

The present disclosure provides a seat belt buckle release alarm device that may be used to prevent infant deaths due to being left unattended in a vehicle.

The present disclosure provides a seat belt buckle release alarm device that does not require any driver intervention or special skills to operate the device.

The present disclosure provides a seat belt buckle release alarm device that has a number of different reminder messages that can be recorded and played back.

The present disclosure is directed to a seat belt buckle release alarm device that does not require a seat belt buckle to be retrofitted for use.

The present disclosure also provides a seat belt buckle release alarm device that does not require any special tools or special training for use.

The present disclosure further provides a seat belt buckle release alarm device that does not interfere with the use of existing seat belts in a vehicle.

The present disclosure is also directed to a seat belt buckle release alarm device that can be constructed using readily available materials and components.

The present disclosure also provides a seat belt buckle release alarm device that is portable and may be used in various vehicles or automobiles.

The present disclosure is directed to a seat belt buckle release alarm device that is simple to use and easily provides a reminder to a driver to not forget anyone or anything within a vehicle.

The present disclosure is further directed to a seat belt buckle release alarm device that allows an individual to record a specific message to be played back upon exiting a vehicle.

The present disclosure provides a seat belt buckle release alarm device that may be removed from one vehicle to be used in a different vehicle.

These and other advantages of the present disclosure will become apparent after considering the following detailed specification in conjunction with the accompanying drawings.

BRIEF DESCRIPTION OF THE SEVERAL VIEWS OF THE DRAWINGS

In the accompanying drawings, in which several of various possible embodiments of the invention are illustrated, corresponding reference characters refer to corresponding parts throughout the several views of the drawings in which.

DETAILED DESCRIPTION OF AT LEAST ONE PREFERRED EMBODIMENT OF THE INVENTION

Figure 1:
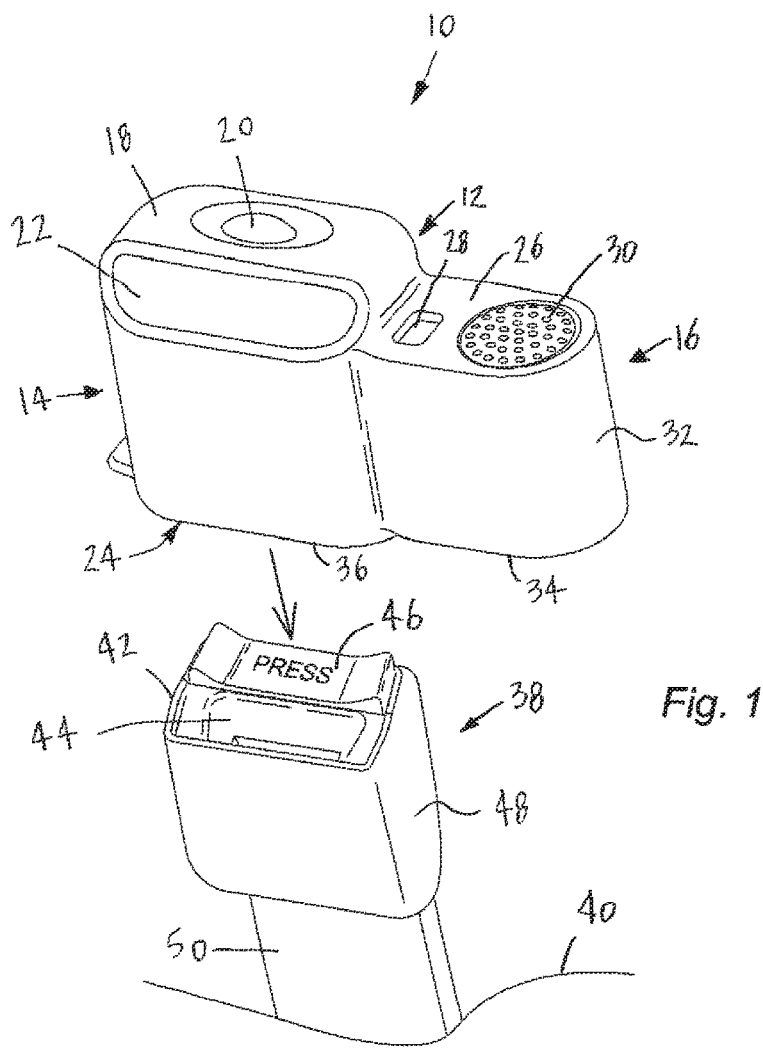
FIG. 1 is a perspective view of a seat belt buckle release alarm device constructed according to the present disclosure about to be inserted over a seat belt buckle.

Referring to the drawings more particularly by reference character, wherein like numbers refer to like items, reference number 10 identifies a preferred embodiment of a seat belt alerting device constructed according to the present disclosure. Turning first to FIG. 1, the seat belt buckle release alarm device 10 is shown comprising a flexible housing or casing 12 having a seat belt buckle receiving portion 14 and a side compartment 16. The seat belt buckle receiving portion 14 has a top 18 having an actuator 20, a latch opening 22, and a seat belt buckle opening 24 formed in a bottom of the portion 14. The side compartment 16 has a top 26 having an USB port opening 28, a speaker grill 30, a side portion 32, and a bottom portion 34. The top 26, the side portion 32, and the bottom portion 34 contain circuitry (not shown) that is used to control the device 10, as will be explained in detail herein. The seat belt buckle opening 24 is formed in a bottom 36 of the receiving portion 14. The opening 24 is adapted to receive therein a seat belt buckle 38 that is in an automobile 40. The seat belt buckle 38 will preferably be the driver's side of the automobile 40. The seat belt buckle 38 has a top 42 having a latch receiving opening 44 and a latch release button 46. A latching mechanism (not shown) is within an outer housing 48 of the seat belt buckle 38. The seat belt buckle 38 is also connected to a seat belt webbing 50. As can be appreciated, the device 10 is positioned to be placed over the seat belt buckle 38.

Figure 2:
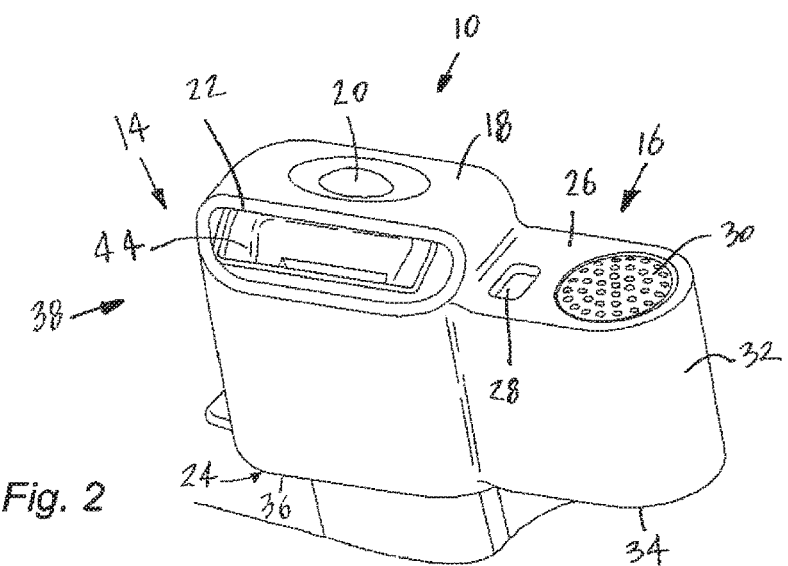
FIG. 2 is a perspective view of the seat belt buckle release alarm device being inserted over the seat belt buckle.

FIG. 2 shows the seat belt buckle release alarm device 10 being placed in position over the seat belt buckle 38. The seat belt buckle opening 24 formed in the bottom 36 of the receiving portion 14 is adapted for receiving therein the seat belt buckle 38. The latch opening 22 is positioned to be adjacent to the latch receiving opening 44 so as not to obstruct the opening 44. The actuator 20 is positioned directly above the latch release button 46, which is obscured in this particular view by the top 18. The side compartment 16 is also shown having the top 26 having the USB port opening 28, the speaker grill 30, the side portion 32, and the bottom portion 34. The side compartment 16 extends out from the receiving portion 14 and is not in the way of the seat belt buckle 38.

Figure 3:
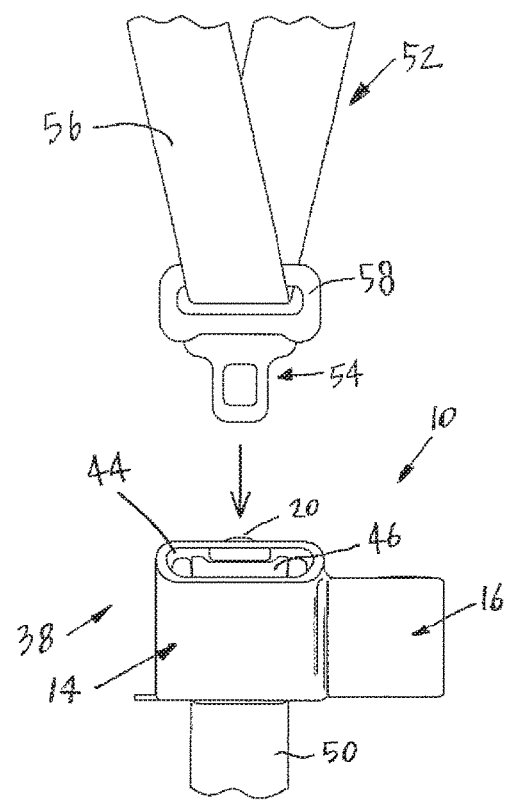
FIG. 3 is a plan view of the seat belt buckle release alarm device being inserted over the seat belt buckle prior to a seat belt being inserted into the seat belt buckle.

With reference now to FIG. 3, the seat belt buckle release alarm device 10 is depicted about to receive a seat belt 52 having a latch plate 54. The seat belt 52 comprises a fabric webbing 56 that is used to secure a main body member 58 that has the latch plate 54 extending therefrom. The main body member 58 and the latch plate 54 are adjustable along the webbing 56, as may be required. As can be appreciated, the latch plate 54 is adapted to fit into the latch receiving opening 44 of the seat belt buckle 38. The seat belt buckle 38 is held in place by the webbing 50. Once the latch plate 54 is inserted therein, a latching mechanism (not shown) internal to the seat belt buckle 38 secures the latch plate 54 to the buckle 38. In order to release the latch plate 54 the latch release button 46 needs to be pressed. However, with the device 10 in place, when top 18 is pressed to actuate the latch release button 46 and release the latch plate 54 actuator 20 is also pressed. As will be described in detail herein, pressing the actuator 20 also activates an audio signal or alert. The seat belt buckle receiving portion 14 and the side compartment 16 are also shown in this particular view.

Figure 4:
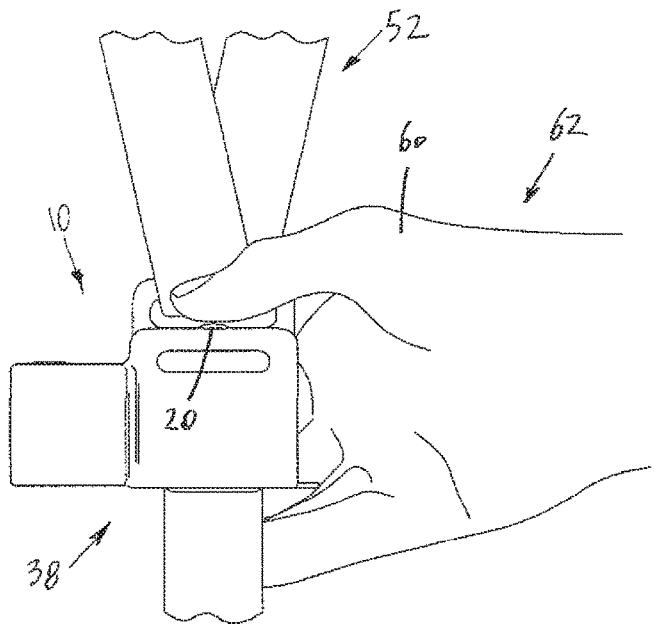
FIG. 4 is a plan view of the seat belt buckle release alarm device being inserted over the seat belt buckle with the seat belt being inserted into the seat belt buckle and prior to the seat belt buckle release alarm device being actuated.

FIG. 4 illustrates the seat belt 52 being connected to the seat belt buckle 38 with the device 10 being inserted over the seat belt buckle 38. A hand 60 of an individual 62 is about to press the actuator 20 which in turn operates the latch release button 46 (not shown) to release the latch plate 54 (also not shown). Once the latch plate 54 is released from the latch receiving opening 44 (not shown) of the seat belt buckle 38 the seat belt 52 will retract to allow the individual 62 to exit from the automobile 40 (FIG. 1). However, by pressing the actuator 20, circuitry (not shown) within the side compartment 16 will be operated to announce an alert about a condition within the automobile 40. For example, if an infant is in the automobile 40 then a prerecorded announcement such as "Infant is present" may be provided to alert the individual 62.

Figure 5:
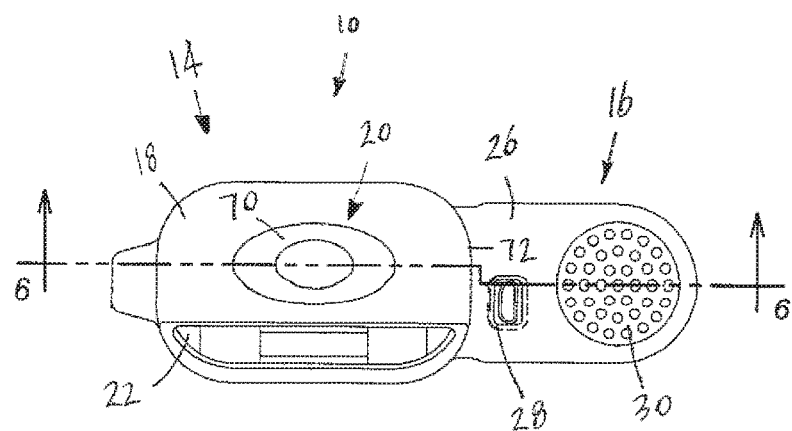
FIG. 5 is a top view of the seat belt buckle release alarm device constructed according to the present disclosure with the seat belt buckle release alarm device being inserted over the seat belt buckle.

Referring now to FIG. 5, a top view of the seat belt alerting device 10 is shown. The seat belt buckle release alarm device 10 has the housing 12 having the seat belt buckle receiving portion 14 and the side compartment 16. The seat belt buckle receiving portion 14 has the top 18 having the actuator 20 and the latch opening 22. The top 18 has a flexible membrane portion or a diaphragm portion 70 that covers the actuator 20. The portion 70 allows the actuator 20 to be easily pressed which in turn is also capable of actuating the latch release button 46. The side compartment 16 is shown having the top 26 having the USB port opening 28 and the speaker grill 30. The side compartment 16 extends out from a side 72 of the seat belt buckle receiving portion 14. In this manner the side compartment 16 is not in the way of the latch opening 22.

Figure 6:
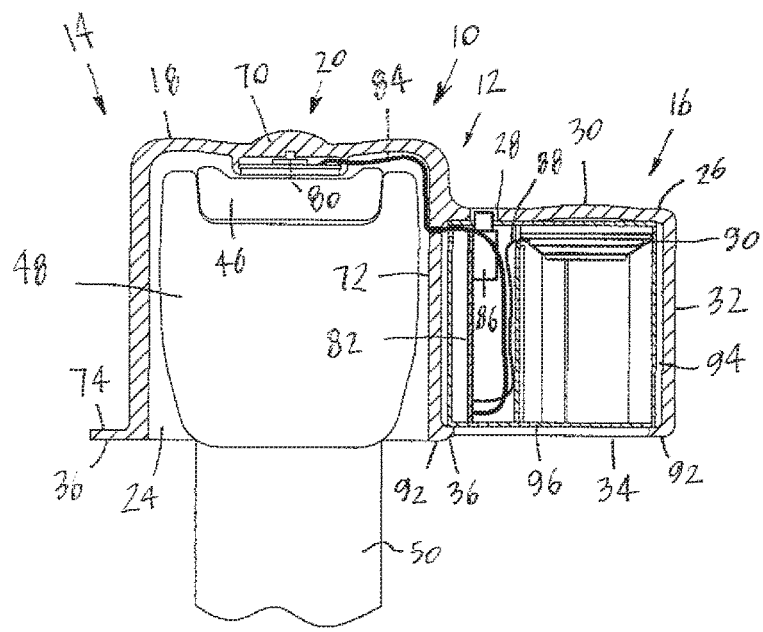
FIG. 6 is a cross-sectional view of the seat belt buckle release alarm device taken along the plane of line 6-6 in FIG. 5.

FIG. 6 illustrated a cross-sectional view of the seat belt buckle release alarm device 10 with the seat belt buckle 38 inserted into the device 10. The device 10 has the housing 12 which includes the seat belt buckle receiving portion 14 and the side compartment 16. The seat belt buckle receiving portion 14 has the top 18 having the actuator 20 and the seat belt buckle opening 24 formed in the bottom 36 of the seat belt receiving portion 14. The bottom 36 has a tab portion 74 that may be used to grasp the housing 12 or the seat belt buckle receiving portion 14. The actuator 20 has a pressure switch or switch device 80 that may be positioned within the flexible membrane 70. The switch device 80 is positioned directly above the latch release button 46. By pressing the actuator 20, the switch device 80 is actuated and the latch release button 46 is also operated. The switch device 80 is connected to a circuit board 82 located within the side compartment 16 by an electrical lead 84. Although only one electrical lead 84 is shown it is possible that more than one lead may be provided between the switch device 80 and the circuit board 82. The circuit board 82 may have a USB port 86 connected thereto. A wire 88 is used to connect the circuit board 82 to a speaker 90. Again, although one wire 88 is shown it is contemplated that more than one wire may be provided. The USB port 86 is aligned with the USB port opening 28 and the speaker 90 is aligned with the speaker grill 30. The side compartment 16 has the top 26, the side portion 32, and the bottom portion 34. The bottom portion 34 also has a peripheral rim 92 that is used to contain components, as will be discussed further herein. The top 26, the side portion 32, the bottom portion 34, and the rim 92 form an interior 94 of the side compartment 16 that is used to house or contain a casing 96 that has therein the circuit board 82 that is used to control operation of the device 10. Also, the side compartment 16 extends out from the side 72.

Figure 7:
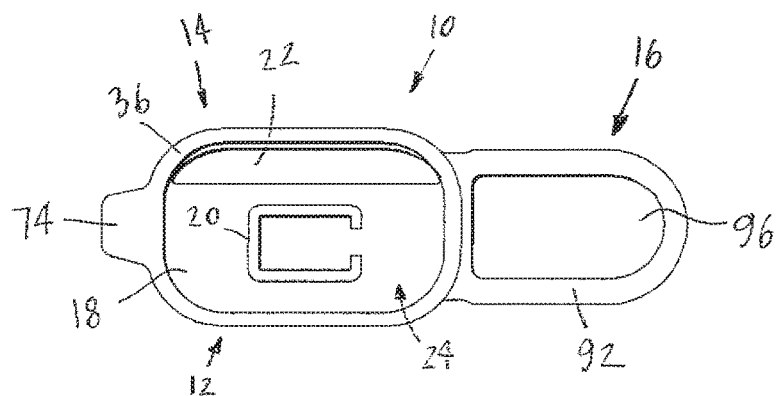
FIG. 7 is a bottom view of the seat belt buckle release alarm device constructed according to the present disclosure.

With particular reference now to FIG. 7, a bottom view of the seat belt buckle release alarm device 10 is shown. The seat belt buckle release alarm device 10 has the flexible housing or casing 12 having the seat belt buckle receiving portion 14 and the side compartment 16. The seat belt buckle receiving portion 14 has the top 18 having the actuator 20, the latch opening 22, and the seat belt buckle opening 24 formed in the bottom 36 of the seat belt buckle receiving portion 14. The tab portion 74 is shown extending outwardly from the bottom 36. The casing 96 has been inserted into the side compartment 16 and the peripheral rim 92 contains the casing 96 therein.

Figure 8:
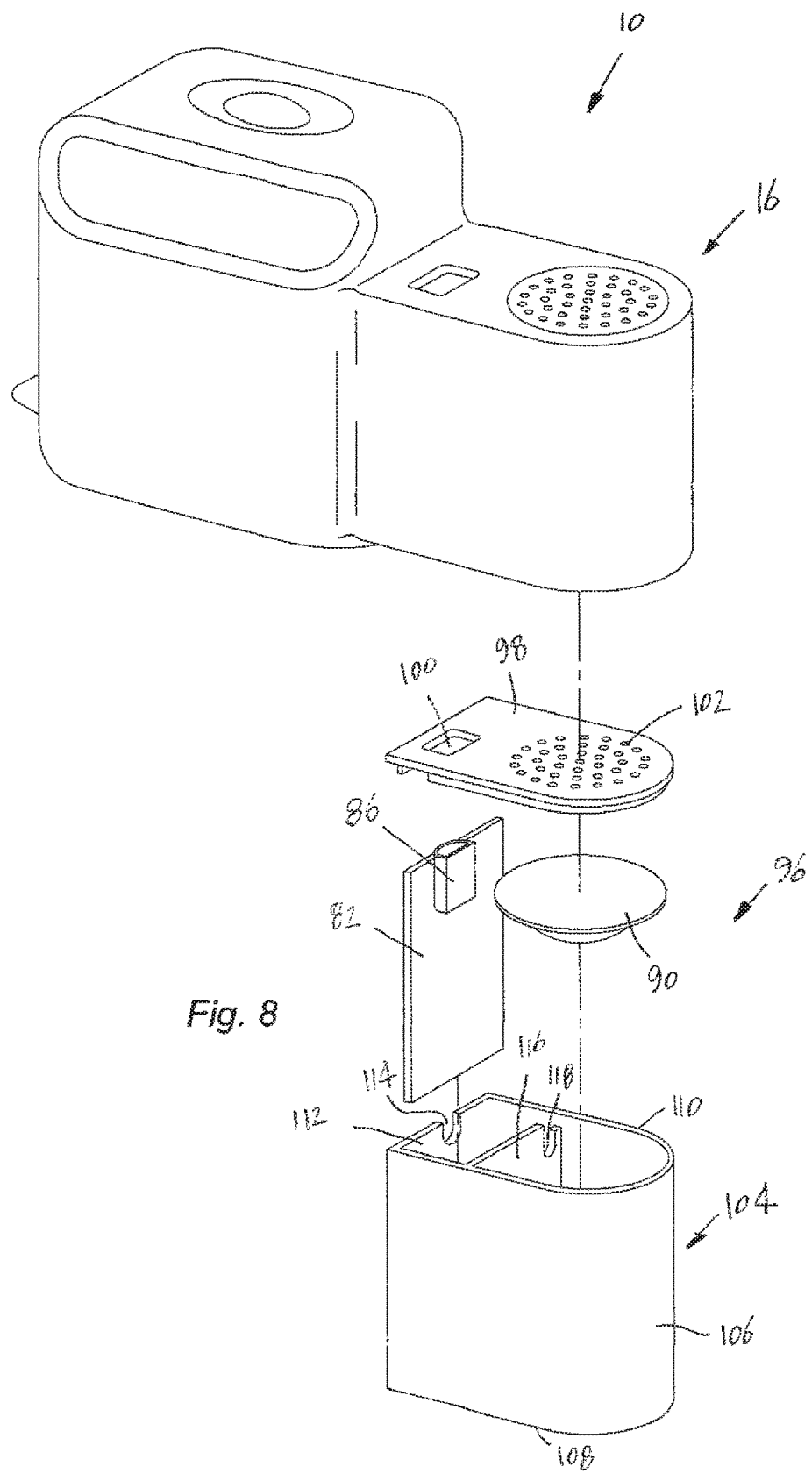
FIG. 8 is an exploded view of interior components of the seat belt buckle release alarm device constructed according to the present disclosure prior to being inserted into the seat belt buckle release alarm device.

FIG. 8 illustrates an exploded view of the casing 96 being removed from the side compartment 16 of the seat belt buckle release alarm device 10. The casing 96 has a top 98 having an USB port opening 100 and a speaker grill 102. The top 98 is removable from a main casing body 104. The main casing body 104 has a side 106, a bottom 108, and a top rim 110. The top rim 110 is used to receive the top 98. The main casing body 104 also has a side wall 112 having a cutout portion 114 and an intermediate wall 116 having a cutout portion 118. The side wall 112 provides a surface against which the circuit board 82 may be mounted or secured. The cutout portion 114 provides an area in which the lead 84 may be routed for connection to the circuit board 82. The cutout portion 118 is used as a path through which the wire 86 may be placed. The circuit board 82 also has the USB port 86 mounted thereon and the speaker 90 is also shown to be positioned in the main casing body 104. As can be appreciated, when the casing 96 is fully assembled it may be pressed into place in the side compartment 16 with the peripheral rim 92 being used to secure the casing 96 in place.

Figure 9:
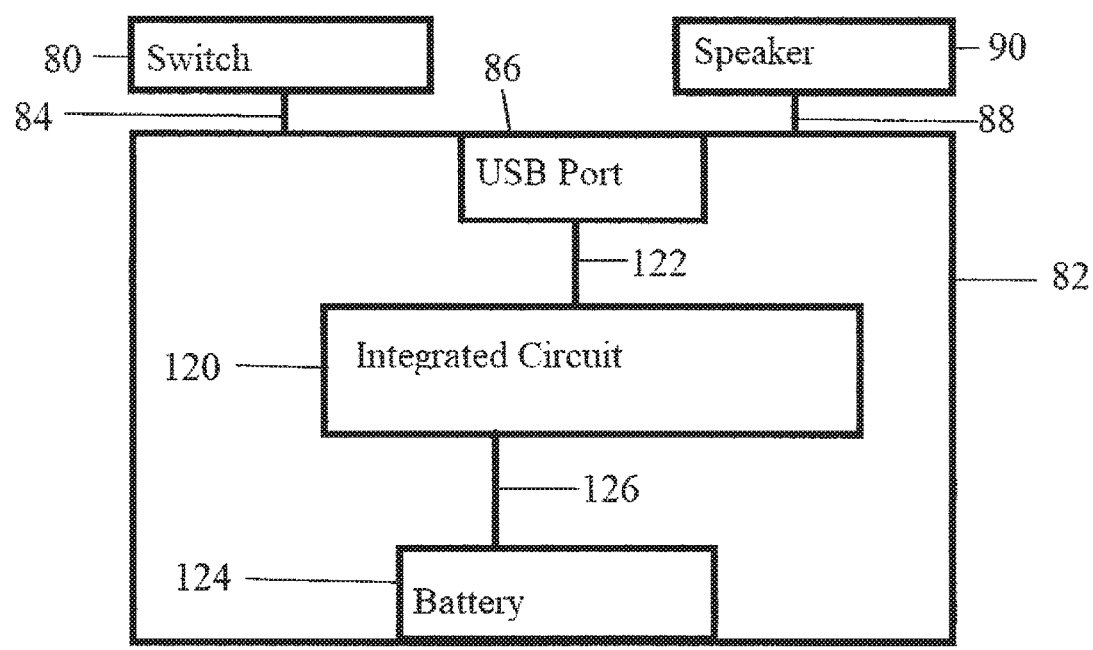
FIG. 9 is a schematic block diagram of the seat belt buckle release alarm device.

FIG. 9 shows a schematic block diagram of the circuit board 82 and the connection to the switch device 80 and the speaker 90. The circuit board 82 may include components such as an integrated circuit 120 that is connected to the switch device 80 by the electrical lead 84, the speaker 90 by the wire 88, and the USB port 86 via a connection 122. The integrated circuit 120 may be powered by a 5V DC power source 124, such as a battery. The power source 124 may be rechargeable through use of the USB port 86. It is also possible that the power source 124 may be replaceable and by removing the casing 96 from the side compartment 16 this can be accomplished. Power from the power source 124 is provided to the integrated circuit 120 over a connection 126. The circuit board 82 may be a printed circuit board. An audio recording may be provided to the integrated circuit 120 by use of the USB port 86. For example, a smart phone (not shown) may have an application that allows recording of a message. The USB port 86 may be connected to the smart phone and the recorded message will be provided to the integrated circuit 120 for storage in non-volatile memory or cells within the integrated circuit 120. By way of example, a ten second message may be stored in the integrated circuit 120. The integrated circuit 120 may include other features such as automatic gain control, an anti-aliasing filter, a built in audio amplifier, and a smoothing filter to further process the recorded message. The integrated circuit 120 can retain a stored message for many years and is capable of having many read/write cycles. Due to this, the recorded message may be changed numerous times. Various other components may be included on the circuit board 82. By way of example only, a Bluetooth receiver can be connected to the integrated circuit 120 to allow the message to be recorded to be sent by a radio signal.

The seat belt buckle release alarm device 10 may operate in the following manner. The device 10 may initially have a prerecorded message stored in the integrated circuit 120 or an individual may record a message to be stored in the integrated circuit 120. For example, a prerecorded message may be "remember the baby" to alert the individual to not forget that a baby or infant is in the automobile 40. The individual may then place the device 10 over the seat belt buckle 38 of the driver's position through use of the seat belt buckle opening 24 formed in the bottom 36 of the portion 14. Once in position, the device 10 is capable of receiving the latch plate 54 of the seat belt 52 through the latch opening 22. The latch plate 54 is then inserted into the latch receiving opening 44 of the seat belt buckle 38 to secure the individual driver in place through the use of the seat belt 52. When the individual driver needs to exit from the automobile 40, the actuator 20 is pressed which operates the latch release button 46 to release the latch plate 54 from the seat belt buckle 38. Pressing the actuator 20 also sends a signal to the integrated circuit 120 to send the stored recorded message to the speaker 90 to be played. The driver will hear the recorded message and then will be notified that a baby or an infant is still in the automobile 40. As has been indicated above, the USB port 86 may be used to record a new message to be stored in the integrated circuit 120. For example, the individual may not have a baby or an infant, but the individual may own a pet. The recorded message may be "remember Fletcher" so that the individual will be alerted that the individual's dog named Fletcher is still in the automobile 40. Also, other messages may be recorded and stored in the integrated circuit 120 as may be required. For example it may be used as a reminder of more transient things such as "Don't forget the flowers" for anniversary and may be recorded even while driving.

From all that has been said, it will be clear that there has thus been shown and described herein a seat belt buckle release alarm device which fulfills the various objects and advantages sought from the invention. It will be apparent to those skilled in the art, however, that many changes, modifications, variations, and other uses and applications of the subject seat belt buckle release alarm device are possible and contemplated. All changes, modifications, variations, and other uses and applications which do not depart from the spirit and scope of the disclosure are deemed to be covered by the disclosure, which is limited only by the claims which follow.

What is claimed:

1. A seat belt buckle release alarm device comprising:
   a flexible housing having a seat belt buckle receiving portion and a side compartment;
   a pressure sensitive actuator formed in a top of the seat belt buckle receiving portion;
   a latch opening formed in the seat belt buckle receiving portion;
   a seat belt buckle opening formed in a bottom of the seat belt buckle receiving portion configured to slip the seat belt receiving portion over a seat belt buckle;
   a flexible membrane or diaphragm portion in the top of the seat belt receiving portion that covers the actuator above a seat belt latch release button in the seat belt buckle;
   the side compartment having a top having an USB port opening, a speaker grill, a side portion, and a bottom portion with the top, the side portion, and the bottom portion forming an enclosure for containing control circuitry; and
   the side compartment extending out from the seat belt buckle receiving portion.

2. The seat belt buckle release alarm device of claim 1 wherein the actuator comprises a switch.

3. The seat belt buckle release alarm device of claim 2 further comprising a circuit board positioned within the side compartment, the circuit board having connected thereto the switch, an USB port, and a speaker.

4. The seat belt buckle release alarm device of claim 3 wherein the circuit board further comprises an integrated circuit connected to the USB port, the speaker, and the switch.

5. The seat belt buckle release alarm device of claim 4 wherein the circuit board further comprises a battery for supplying power to the integrated circuit.

6. The seat belt buckle release alarm device of claim 5 wherein the battery is rechargeable through use of the USB port and the integrated circuit.

7. A seat belt buckle release alarm device comprising:
   a flexible housing having a seat belt buckle receiving portion having an actuator formed in a top of the seat belt buckle receiving portion, a latch opening formed in the seat belt buckle receiving portion, and a seat belt buckle opening formed in a bottom of the seat belt buckle receiving portion configured to slip the seat belt receiving portion over a seat belt buckle, a flexible membrane or diaphragm portion in the top of the seat belt receiving portion that covers the actuator above a seat belt latch release button in the seat belt buckle, and a side compartment extending out from the seat belt buckle receiving portion with the side compartment having a top having an USB port opening and a speaker grill, a side portion, a bottom portion forming an enclosure having an opening formed therein with the top, the side portion, and the bottom forming an interior of the side compartment; and
   a casing for insertion into the interior of the side compartment, the casing having a circuit board having an USB port and a speaker.

8. The seat belt buckle release alarm device of claim 7 wherein the casing is removable from the interior of the side compartment.

9. The seat belt buckle release alarm device of claim 7 wherein the USB port of the casing is positioned adjacent to the USB port opening in the housing and the speaker of the casing is positioned adjacent to the speaker grill in the housing.

10. The seat belt buckle release alarm device of claim 7 wherein the actuator comprises a pressure switch.

11. The seat belt buckle release alarm device of claim 7 wherein the circuit board further comprises an integrated circuit connected to the USB port, the speaker, and the switch.

12. The seat belt buckle release alarm device of claim 11 wherein the circuit board further comprises a battery for supplying power to the integrated circuit.

13. A seat belt buckle release alarm device comprising:
   a flexible housing having a seat belt buckle receiving portion having an actuator formed in a top of the seat belt buckle receiving portion, a latch opening formed in the seat belt buckle receiving portion, and a seat belt buckle opening formed in a bottom of the seat belt buckle receiving portion configured to slip the seat belt receiving portion over a seat belt buckle, a flexible membrane or diaphragm portion in the top of the seat belt receiving portion that covers the actuator above a seat belt latch release button in the seat belt buckle, and a side compartment extending out from the seat belt buckle receiving portion with the side compartment having a top having an USB port opening and a speaker grill, a side portion, a bottom portion having an opening formed therein with the top, the side portion, and the bottom portion forming an interior of the side compartment, and the bottom portion having a peripheral rim; and
   a casing for insertion into the interior of the side compartment, the casing having a circuit board having an USB port and a speaker with the peripheral rim formed in the bottom portion for retaining the casing within the interior of the side compartment.

14. The s seat belt buckle release alarm device of claim 13 wherein the peripheral rim is flexible.

15. The seat belt buckle release alarm device of claim 13 wherein the USB port of the casing is positioned adjacent to the USB port opening in the housing and the speaker of the casing is positioned adjacent to the speaker grill in the housing.

16. The seat belt buckle release alarm device of claim 13 wherein the actuator comprises a pressure switch.

17. The seat belt buckle release alarm device of claim 13 wherein the circuit board further comprises an integrated circuit connected to the USB port, the speaker, and the switch.

18. The seat belt buckle release alarm device of claim 17 wherein the circuit board further comprises a battery for supplying power to the integrated circuit.

19. The seat belt buckle release alarm device of claim 18 wherein the battery is rechargeable through use of the USB port and the integrated circuit.

* * * * *